Sept. 13, 1966 P. S. DOKUCHITZ ETAL 3,273,032
ELECTRICAL CONDENSERS AND METHOD OF MAKING THE SAME
Filed Jan. 19, 1960 2 Sheets-Sheet 1
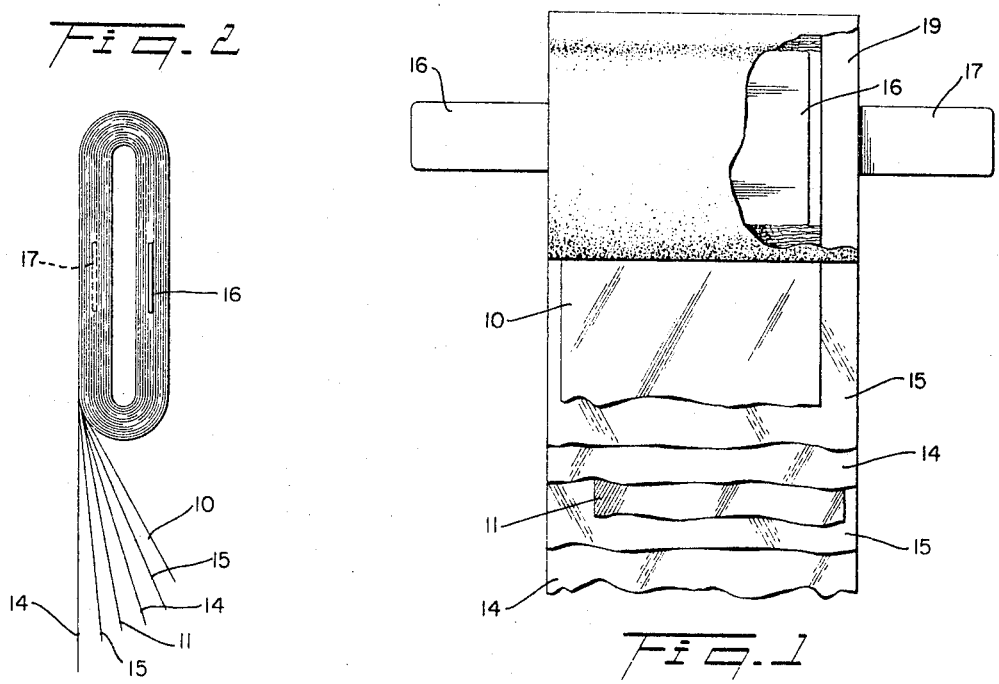
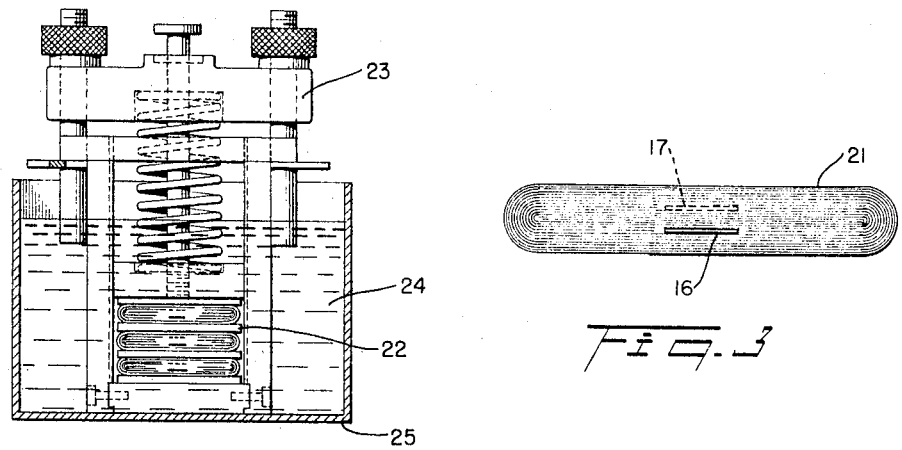
INVENTORS
PETER S. DOKUCHITZ
MICHAEL MILKOWSKI
BY
*Bauer and Seymour*
ATTORNEYS Sept. 13, 1966  P. S. DOKUCHITZ ETAL  3,273,032
ELECTRICAL CONDENSERS AND METHOD OF MAKING THE SAME
Filed Jan. 19, 1960  2 Sheets-Sheet 2
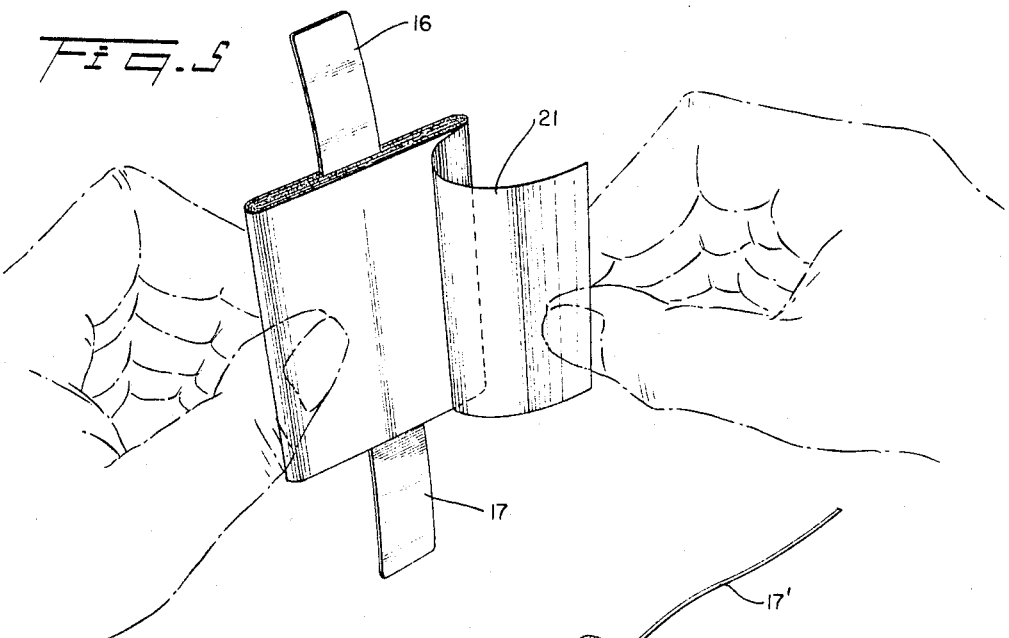
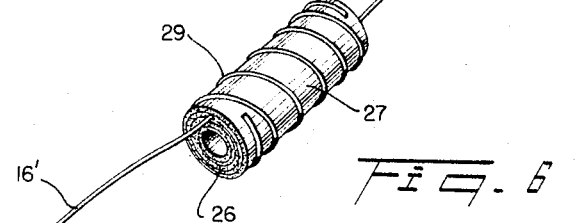
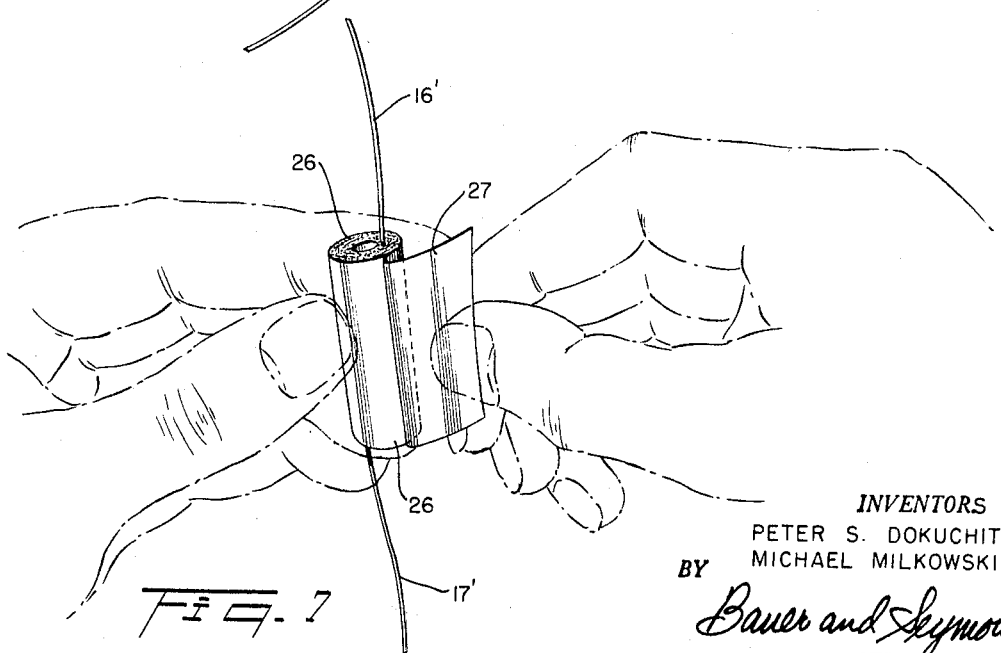
INVENTORS
PETER S. DOKUCHITZ
BY  MICHAEL MILKOWSKI
Bauer and Seymour
ATTORNEYS United States Patent Office 3,273,032
Patented Sept. 13, 1966

3,273,032
ELECTRICAL CONDENSERS AND METHOD OF MAKING THE SAME
Peter S. Dokuchitz, Unadilla, and Michael Milkowski, Sidney, N.Y., assignors to The Bendix Corporation, a corporation of Delaware
Filed Jan. 19, 1960, Ser. No. 3,433
11 Claims. (Cl. 317—258)

This invention relates to electrical apparatus and more particularly to electrical condensers or capacitors, and to methods for fabricating the same.

One of the objects of the present invention is to provide an electrical condenser of novel construction which has better physical and electrical characteristics and properties than condensers heretofore made of the same or generally similar materials.

Another object of the present invention is to provide a novel condenser which successfully operates for long periods without deterioration at temperatures on the order of 800° F.

Still another object is the provision of a novel condenser which successfully withstands hard usage in either ground or airborne applications without substantial alteration of its electrical characteristics.

Another object is to provide a novel, high quality condenser having the above properties which may be made at relatively low cost.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a view in side elevation of a partially wound condenser;

FIG. 2 is an end view illustrating a condenser or capacitor in the process of being wound;

FIG. 3 is an end view of a compacted condenser made in accordance with the method of FIGS. 1 and 2, the condenser in FIG. 3 being shown provided with a plurality of layers of covering foil prior to its being impregnated in accordance with the invention;

FIG. 4 is a view in elevation of a plurality of covered condensers, such as shown in FIG. 3, in a compressing fixture, the condensers and fixture being shown immersed in a tank containing impregnating liquid, the tank being shown in section;

FIG. 5 is a view in perspective of the first embodiment of condenser, such condenser being shown after its impregnation and curing, a portion of the condenser being shown having the covering and protecting layers of foil being removed therefrom;

FIG. 6 is a view in perspective of a second embodiment of condenser made in accordance with the invention, such condenser being round, and being provided with a plurality of covering and protecting layers of foil; and FIG. 7 is a view in perspective of the round condenser of the second embodiment, such condenser being shown after its impregnation and curing, a portion of the condenser being shown having the covering and protecting layers of foil being removed therefrom.

The condenser of the present invention represents an improvement over that disclosed in Ruscito applications Serial No. 248,698, filed Sept. 28, 1959, now Patent No. 2,951,002, and Serial No. 741,709, filed June 4, 1958, now Patent No. 3,026,457. The condenser of the present invention, which is made in generally the same manner as that described and claimed in the above Ruscito applications, is particularly adapted for applications wherein during use it may be subjected to a wide range of temperatures ranging, for example, from −67° F. to +800° F. Temperatures of such range may be encountered in equipment employed in the Arctic wherein the condenser is closely associated with a rocket, ram jet or jet engine. It is important that such condensers suffer no ill effects or marked changes in capacity as their temperature is changed within the operational range and even though they are subjected to marked mechanical shocks as by reason of acceleration, a landing of an aircraft, and the like.

The so-called condenser or capacitor discharge type of ignition system for combustion engines has come into quite common use in recent years, particularly on rocket, jet or gas turbine engines for aircraft and missiles where a high energy spark is required. In these systems a condenser is repeatedly charged and discharged to create the necessary ignition sparks having high energy. Accordingly, the condenser is an essential part of such ignition systems, and failure thereof is likely to result in failure of the engine and consequent loss of life or severe injury to personnel and destruction of valuable aircraft or other property. It is therefore an important object of this invention to improve this essential element of present-day ignition systems by making the same more efficient and more durable, particularly as regards its resistance to deterioration under conditions imposing wide variations in operating temperature.

Both embodiments of the invention illustrated in the drawings, and thereafter described in detail by way of example only, are condensers having a capacity of .14µ f. and adapted for use as a storage condenser in an engine ignition system. The conductive plates of each of the condensers are constituted by two strips 10 and 11 of thin metal foil. Aluminum foil having a thickness of about .00025″ has been found satisfactory in one commercial embodiment. These strips are preferably of equal width and are spirally wound directly over each other but separated and insulated from each other by two layers 14 and 15 of suitable insulating material. In the preferred embodiments of the present invention layers 14 and 15 are made of "Samica," which is a reconstituted mica made by the Samica Company. Each insulating sheet 14 and 15 is, in the described embodiments, about .0013″ thick and sufficiently wide to extend about .062″ beyond each side edge of the foil sheets 10 and 11. The foil sheets are preferably longitudinaly offset about a half inch so that the adjacent ends thereof will be staggered in a like amount. The foil sheets are of course, insulated from each other throughout the condenser by insulating layers 14 and 15, and a few of the outer-most turns of the condenser are preferably free of foil.

Terminal 16 and 17 preferably extend from laterally opposed halves and opposed ends of the condenser. Said terminals may consist of thin strips of metal, preferably nickel, one in good electrical contact with foil plate 10, and one in good electrical contact with foil plate 11. The terminal strips may be loosely inserted in the position shown when the condenser has been approximately half wound. When the condenser has been impregnated and compressed in the novel manner hereinafter described, the terminals will make excellent contact with the foil layers and be well secured in position without the use of solder or the like. The wound layers of foil and insulating sheets are impregnated and retained in shape, in a substantially flat, and out-of-round, or a round shape, by a special insulating compound which is applied in a manner which is to be hereinafter described. In FIG. 3 the layers of foil and insulating sheets are tightly compressed in a flat shape with the compound filling the pores and interstices in the interposed Samica layers, thereby improving the insulating properties thereof. The Samica layers are not stressed by the action of the impregnating compound and the strength and density thereof are rendered substantially greater by compression than they were before fabrication of the condenser. In the second embodiment of condenser the condenser is left in its round shape. It is to be understood, however, that within the broad scope of the invention, the condenser may be of a wide variety of shapes, and that the successive layers thereof may be assembled by stacking separate sheets rather than by winding continuous sheets or strips together as shown.

The condenser is preferably fabricated by the following method. The foil layers 10 and 11 and the Samica layers 14 and 15 are tightly wound on a flat, highly polished mandrel which may be very slightly tapered, such as to the extent of about .001″ per inch of length. When winding the two layers of foil and two interposed layers of insulating strip so that there is a layer of insulation between the foil strips at all points, care should be taken to avoid any wrinkles. When about half the length of the paper and foil strips have been wound, the terminal strips 16 and 17 are inserted in the positions illustrated. These leads or terminals should be smooth and free of any particles which might rupture the insulating layers 14 and 15 or foil strips under compression. The winding should be carried out in a room free from dust or similar particles of foreign matter in the air. When the desired number of turns has been wound, the foil layers are cut with the adjacent ends thereof staggered about a half inch or more and at least the outside Samica layer is wound completely to cover the outside foil.

After completion of such winding, the condenser is wrapped with a number of full turns of foil 21 to constitute a protecting, for the condenser impervious cover therefor. Aluminum foil having a thickness of .001″ and wound upon the condenser to constitute 6 full turns thereon, has proved to be a satisfactory cover. Preferably such winding of the cover is also accomplished on the winding machines, so that the cover may be tightly positioned upon the condenser, whereby the foil and insulating layers of the condenser will be held in tight contact with each other when the condenser has been flattened to the condition of FIG. 3.

The thus wound and covered condenser is now slipped off the mandrel, and a plurality of such condensers are then pressed in a suitable stacking mold 23 as shown in FIG. 4, each condenser section being separated from the others by a plate 22 of suitable non-corrodible metal such as "Inconel." The stacking mold, which is in the nature of a press, includes means whereby the stacked condensers may be subjected to and maintained under a substantial pressure during the impregnation and curing of the condenser sections. In accordance with the invention, satisfactory condensers are produced when the condenser sections are subjected to a pressure of approximately 300 pounds per square inch. The condenser sections are now ready to be impregnated.

The preferred impregnating material is composed essentially of high melting point inorganic materials which are dispersed and/or dissolved in a suitable vehicle. Such impregnating material has as its functions the filling of any minute voids between its stacked layers of foil and insulation in the condenser, and the adherence of such layers into a strong rigid block-like structure which is resistant to mechanical and thermal shocks.

In the preferred embodiment of the invention, the impregnating material consists of distilled water, boric acid, and magnesium oxide in the following ratio:

Distilled water _____ ml__ 500
Boric acid ($H_3BO_3$) _____ grams__ 200
Magnesium oxide (MgO) _____ do____ 15

The impregnating material is prepared by first boiling the distilled water, and then slowly adding thereto the mixture of boric acid and magnesium oxide in the above ratio. After the resulting solution has come to a boil, the mold with a plurality of condenser sections contained therein is completely immersed in the boiling solution 24 in a heated vessel or tank 25. The mold is retained in the solution for a period sufficient to insure complete impregnation of the condenser. Such period is ordinarily from 20–60 minutes after the solution has again come to a boil after immersion of the mold. The impregnating solution should be freshly made before each series of impregnating operations; the solution should not be allowed to cool after it has been made and before its use.

The mold is now taken out of the impregnating solution and is allowed to stand at room temperature for 6–8 hours. The sections are then cured, while being still retained in the mold, by heating the mold and the contained condenser sections first to 190° F. and retained at such temperature for from 10–12 hours, and then by raising the mold and the condensers therein to a temperature of 600° F. and retaining them at such temperature for 12–15 hours. Following such treatment at 600° F., the condenser sections are removed from the mold, the protective layers of foil 21 are removed therefrom, and the condenser sections are finally cured at 800° F. for from 12–15 hours.

In making the round condenser sections shown in FIGS. 6 and 7 generally the same series of manipulative steps are employed except for those which are dispensed with by reason of the fact that no pressing mold is employed.

The round condenser sections 26 are wound on a round collapsible mandrel in much the same manner as shown in FIG. 1. A plurality of layers of covering foil 27, similar to that employed in the first embodiment, are wound upon the thus formed condenser section. A clamping device, or a plurality of clamping devices, such as a wire 29 wound about the section, is employed to keep the foil from unwrapping. Lead wires 16′ and 17′ are employed, such wires being electrically connected to the respective foil plates of the condenser.

The thus prepared condenser sections, while still on their winding mandrels, are dropped into a boiling impregnating solution which may be the same as that disclosed in connection with the first embodiment, and are boiled in the same manner as that employed with the first described embodiment of condenser. Following this, the condenser sections are removed from the solution, allowed to stand at room temperature for 6–8 hours, and are then cured as follows: 190° F. for 10–12 hours; 600° F. for 12–15 hours.

After such treatment of the condenser sections, they are cooled, removed from their mandrels, and the outer, protective layers of foil 27 are removed from the sections. Following this, the condenser sections are further cured by being held at a temperature of 800° F. for 12–15 hours. The exposed ends of lead wires 16′ and 17′ are then cleaned, and the condensers are individually tested for capacity, power factor, breakdown voltage, and insulation resistance. For best results the condensers should be housed in a moisture-tight casing or coating both during storage and use.

Condensers produced by use of the above-disclosed method are superior to those of the prior art by reason of their compactness and rigidity and strength, and by their ability to withstand a wide range of temperature vartiations without damage. Because the condensers of the invention contain no organic material, the temperature at which the condenser may be operated without damage is limited only by temperature of softening and/or deformation of the metal foil making up the opposed plates of the condenser.

There is thus provided a novelly constructed electrical condenser or capacitor in the form of a solid and dense mass which is entirely free of internal voids or air pockets and wherein the layers are free of detrimental internal stresses. Said condenser is capable of withstanding higher voltages at the higher temperatures than heretofore known condensers of comparable size and weight and has higher insulation resistance than any previously known condenser of comparable capacity. The elevated temperatures at which the condenser of the invention can be successfully used are, in general, limited only by the limiting usable or workable electrical resistance of the condenser in a particular electrical circuit. In comparison to known structures, said condenser permits less electrical losses, possesses a better power factor and has less corona. The invention also comprehends a novel method for making condensers to endow them with the above advantages. Condensers made in accordance with said method are extremely reliable and will function efficiently and effectively for longer periods of time under severe operating conditions than known types of condensers adapted for the same purposes and uses. Said condensers are physically durable as well as electrically superior.

In the above-disclosed preferred impregnating material, the boric acid is present in such amounts as to form a fairly concentrated solution thereof, and the magnesium oxide is present in an amount approaching the saturation point. The boric acid has the function of forming, in the subsequent heat treatment of the impregnated condenser, a glass bonding agent of fused boric oxide which effectively bonds the various layers of the condenser together. The magnesium oxide is an excellent electrical insulator, and functions to improve the dielectric properties of the impregnating material. The impregnating material may consist solely of a solution of boric acid in water. Markedly improved dielectric and insulating properties are obtained, however, when there is employed in conjunction with the boric acid an electrically insulating oxide, such as magnesium oxide, or an oxide-forming material.

The boric acid can be employed in accordance with the invention throughout an appreciable range of concentration, depending upon the results desired. Thus, in order to obtain adequate bonding between the layers of the condenser there should be sufficient boric acid carried into the condenser to form a strong bond therein upon the heating of the condenser. The upper limit of the concentration of the boric acid is obviously saturation of the impregnating solution. Preferably the solution is somewhat below complete saturation, however, in order that it may thoroughly and uniformly impregnate the condenser and penetrate into all of the spaces therein before much, if any, deposition of solid material from the solution occurs.

The concentration of magnesium oxide may likewise be varied widely. It may be employed, when it is used, in amounts varying from small but effective amounts to substantial saturation of the solution. As above noted, the electrical insulating and dielectric properties of the insulating material is improved by the presence of magnesium oxide.

One or more different electrically insulating soluble oxides or oxide-forming salts may be substituted for the magnesium oxide in the above-preferred impregnating solution. All salts which are soluble in water and which, upon heating in a cycle such as that discussed above, yield an electrically insulating oxide, are satisfactory. Typical of such other materials are aluminum nitrate and magnesium nitrate. When aluminum nitrate is dissolved with boric acid in water to form an impregnating solution and a condenser is impregnated therewith, subsequent heat treatment of the impregnated condenser is believed to change the impregnant to aluminum oxide, with traces of aluminum hydroxide and boron nitride.

It has been found that superior high temperature resistant condensers may be made by employing as an impregnant a solution of aluminum nitrate alone in water, the aluminum nitrate being present in a range from an effective amount to substantial saturation. Upon heating the impregnated condenser, the aluminum nitrate breaks down to aluminum oxide and a small amount of aluminum hydroxide; such products effectively bond the layers of the condenser together and also form a desirable dielectric therefor.

Generally similar results are obtained when a solution of magnesium nitrate is employed as an impregnant for the condenser sections. For this purpose there may be employed a solution of magnesium nitrate alone in water, the magnesium nitrate being present in a range from an effective amount to substantial saturation. Upon heating the impregnated condenser, the magnesium nitrate breaks down to magnesium oxide and a small amount of magnesium hydroxide; such products effectively bond the layers of the condenser together and also form a desirable dielectric therefor.

The provision of covering layers about the condenser and the maintenance of the layers of the condenser under substantial compression and confinement during the impregnation of the condenser and its subsequent heat treatment insures that the insulating layers retain their integrity. This is particularly necessary when the insulating layers are formed of material such as reconstituted mica (Samica), wherein the various small plate-like elements forming the sheets 14 and 15 thereof appear to be held together largely by electrostatic charges. If such material is immersed in boiling water for any length of time while in unconfined and uncompressed condition, it substantially wholly disintegrates and falls apart. When, however, it is subjected to impregnation while confined and compressed in a manner such as herein disclosed, the insulating material retains its continuity and integrity and, when the impregnating material is subjected to heat treatment, is strengthened by the cured impregnant. Condensers made in accordance with the present invention are particularly radiation resistant in fields of high gamma ray intensity. This results from the high resistance of the inorganic impregnating material to breakdown when subjected to radiation, including gamma ray radiation.

Although only a limited number of embodiments of or variations in the condenser and method comprehended by the invention have been illustrated in the drawings and described in the foregoing specification, it is to be expressly understood that the invention is not so limited. Thus, for example, the Samica insulating sheets may be replaced by sheets of other high temperature-resistant sheet material having suitable properties, such as glass paper of which those sold as "Tissuglas" by American Machine and Foundry Company, "Refrasil," sold by H. I. Thompson Fiber Glass Co., and "Fiberfrax," sold by The Carborundum Company, are typical. Various other changes and modifications which do not depart from the spirit and scope of the invention will now be apparent to those skilled in the art.

What is claimed is:

1. An electrical condenser comprising a plurality of tightly stacked superimposed layers of sheet metal, at least one layer of insulating sheet material interposed between each successive pair of metal layers, means electrically connecting alternate metal layers tgoether, and a solid insulating compound filling the spaces between said metal and insulating layers, the insulating compound consisting predominantly of a refractory oxygen compound of boron deposited in situ, the insulating compound impregnating the insulating layers, bonding the layers of the condenser together, and retaining such layers in tightly stacked condition.

2. An electrical condenser as defined in claim 1, wherein the insulating compound consists essentially of a major proportion of a refractory oxygen compound of boron and a minor proportion of a refractory electrically insulating oxide uniformly dispersed therein.

3. An electrical condenser as defined in claim 2, wherein the insulating oxide is magnesium oxide.

4. The method of impregnating an electrical condenser having a plurality of superimposed thin metal plates separated by thin layers of electrically insulating sheet material, the metal plates and layers of insulating sheet material being held together under compression, which includes immersing the condenser in an impregnating bath consisting largely of a solution of an inorganic glass-forming material in a vehicle, heating the bath while the condenser is thus immersed therein, leaving the condenser in the bath for a sufficient length of time for the solution to penetrate completely into the interstices in the condenser withdrawing the condenser from the bath, and heating the condenser so as to volatilize and drive off the vehicle and to decompose the solid material deposited from the solution to form a glass bond within the interstices in the condenser.

5. The method of making an electrical condenser which includes superimposing alternate layers of sheet metal with at least one layer of sheet insulating material interposed between successive layers of sheet metal, substantially completely enclosing the broad surfaces of the thus assembled layers in at least one layer of covering material so as to leave at least an end of the stack uncovered, subjecting the thus covered stack to compression to retain the layers thereof in tight contact, immersing the thus covered and compressed stack in an impregnating bath consisting largely of a solution of an inorganic glass-forming material in a vehicle, heating the bath while the stack is thus immersed therein, leaving the stack in the bath for a sufficient length of time for the solution to penetrate completely into the stack, withdrawing the stack from the bath, and while the stack is still confined and under compression heating the stack so as to volatilize and drive off the vehicle and to decompose the solid material deposited from the solution to form an inorganic glass dielectric within the condenser which binds the layers of the stack together.

6. The method as defined in claim 4, wherein the insulating material is made of mica.

7. The method as defined in claim 4, wherein the glass-forming material is composed largely of boric acid.

8. The method as defined in claim 7, wherein the impregnating bath further includes a minor amount of dissolved inorganic material which supplies finely divided refractory electrically insulating oxide upon the heating of the condenser to form the bonding material.

9. The method of making an electrical condenser which includes superimposing alternate layers of sheet metal with at least one layer of sheet insulating material interposed between successive layers of sheet metal to from a stack, substantially completely enclosing the broad surface of said stack with an impermeable protective sheath while leaving at least one end of the stack uncovered, subjecting the thus covered stack to compression to retain the layers thereof in tight contact and the sheath in tight engagement with the stack, immersing the thus covered stack in an impregnating bath consisting largely of a solution of boric acid in water and a minor amount of dissolved magnesium oxide, heating the bath while the stack is thus immersed therein, leaving the stack in the bath for a sufficient length of time for the solution to penetrate completely into the stack, withdrawing the stack from the bath, and while the stack is still confined and under compression heating the stack so as to volatilize and drive off the vehicle and to decompose the solid material deposited from the solution to form a bonding and dielectric glass within the condenser which binds the layers of the stack together, said dielectric glass having finely divided magnesium oxide uniformly dispersed therein.

10. An electrical condenser as defined in claim 1, wherein the said heat resistant insulating sheet material consists essentially of mica.

11. The method of making an electrical condenser which includes superimposing alternate layers of sheet metal with at least one layer of sheet insulating material interposed between successive layers of sheet metal to form an assembled unit, substantially completely enclosing the broad surfaces of the thus assembled unit in at least one layer of covering material so as to leave at least an end of the unit uncovered, subjecting the thus covered unit to compression to retain the layers thereof in tight contact, immersing the thus covered and compressed unit in an impregnating bath consisting largely of a solution of an inorganic glass-forming material in a vehicle, heating the bath while the unit is thus immersed therein, leaving the unit in the bath for a sufficient length of time for the solution to penetrate completely into the unit, withdrawing the unit from the bath, heating the unit while the same is confined and under compression so as to volatilize and drive off the vehicle and to decompose the solid material deposited from the solution to form an inorganic glass dielectric within the unit which binds the layers thereof together, and removing the covering material from the unit after completion of said heating step.

References Cited by the Examiner

UNITED STATES PATENTS

| | | | |
|---|---|---|---|
| 877,089 | 1/1908 | Koch | 317—242 |
| 1,386,008 | 8/1921 | McCullock | 317—258 |
| 2,577,005 | 12/1951 | Giacomo | 317—260 |
| 2,948,838 | 8/1960 | Obenhaus | 317—260 |

FOREIGN PATENTS

| | | |
|---|---|---|
| 203,406 | 11/1955 | Australia. |
| 377,922 | 8/1932 | Great Britain. |
| 432,793 | 7/1935 | Great Britain. |

LEWIS H. MYERS, *Primary Examiner.*

SAMUEL BERNSTEIN, JOHN F. BURNS, *Examiners.*

J. D. KALLAM, E. GOLDBERG, *Assistant Examiners.*